(12) United States Patent
Liu (10) Patent No.: US 9,673,649 B2
(45) Date of Patent: Jun. 6, 2017

(54) CHARGER FOR LITHIUM ION BATTERY

(71) Applicant: GUANGDONG JETFAST PORTABLE LIGHTING CO., LTD., Guangdong (CN)

(72) Inventor: Yun-Zhao Liu, Guangdong Province (CN)

(73) Assignee: Guangdong Jetfast Portable Lighting Co., Ltd., Guangdong (CN)

( * ) Notice: Subject to any disclaimer, the term of this patent is extended or adjusted under 35 U.S.C. 154(b) by 309 days.

(21) Appl. No.: 14/615,636

(22) Filed: Feb. 6, 2015

(65) Prior Publication Data

US 2015/0155731 A1   Jun. 4, 2015

Related U.S. Application Data

(62) Division of application No. 13/885,036, filed on May 13, 2013, now Pat. No. 9,054,346.

(51) Int. Cl.
*H01M 10/46* (2006.01)
*H02J 7/00* (2006.01)

(52) U.S. Cl.
CPC .................................. *H02J 7/0045* (2013.01)

(58) Field of Classification Search
CPC ................................ H02J 7/0042; H02J 7/355
USPC ............ 320/107, 112, 114; 429/96, 99, 100; D13/103
See application file for complete search history.

(56) References Cited

U.S. PATENT DOCUMENTS 7,220,013 B2 * 5/2007 Sharrah ................... F21L 4/085
320/114
2009/0011286 A1 * 1/2009 Liu ........................ H01M 2/105
429/151

* cited by examiner

*Primary Examiner* — Edward Tso
(74) *Attorney, Agent, or Firm* — Rosenberg, Klein & Lee (57) ABSTRACT

A lithium ion battery and a charger thereof are provided. The lithium ion battery comprises a shell (1), a locating seat (2), an end cover (3), a battery cell (4), a positive contact (51), a positive plate (52), a negative plate (53), a positive connecting plate (61) and a negative connecting plate (62). The shell (1) is a one-step-molding cylinder with an upper opening. The positive contact (51) extends out from a contact extending hole (11) of the shell (1). A lower end face of the end cover (3) is tightly pressed on the negative plate (53) and the locating seat (2), where the end cover (3) is detachably connected with the upper opening of the shell (1). A cover edge of the end cover (3) cooperates with an end face of the upper opening of the shell (1). The lithium ion battery is conveniently detachable with the charger thereof.

5 Claims, 11 Drawing Sheets

CHARGER FOR LITHIUM ION BATTERY

RELATED APPLICATIONS

This application is a Divisional patent application of co-pending application Ser. No. 13/885,036, filed on 13 May 2013, now pending. The entire disclosure of the prior application, Ser. No. 13/885,036, from which an oath or declaration is supplied, is considered a part of the disclosure of the accompanying Divisional application and is hereby incorporated by reference.

FIELD OF THE INVENTION

The present invention relates to a lithium ion battery and a charger of the lithium ion battery, especially to a portable lithium ion battery with features of easy-assembly, simple structure and high efficiency and a charger thereof. Moreover, the lithium ion battery is detached from the charger conveniently.

DESCRIPTION OF RELATED ART

The lithium ion battery available now consists of a shell, a locating seat, an end cover, a battery cell, a positive contact, a positive plate, a negative plate, a positive connecting plate and a negative connecting plate. The negative plate is disposed on the locating seat while the positive plate is arranged at the end cover. The shell is formed by two half housings. The two half housings are connected by ultrasonic welding. The locating seat and the end cover are disposed on the shell. The lithium ion battery has shortcomings of complicated assembly and low efficiency.

SUMMARY OF THE INVENTION

Therefore it is a primary object of the present invention to provide a lithium ion battery that is not only with features of easy-assembly, and high efficiency but also is applied to a charger and a flashlight.

It is another object of the present invention to provide a charger of a lithium ion battery that is portable and is applied to charge DC (direct current) powered appliances.

The above objects of the present invention are achieve by a lithium ion battery that includes a shell, a locating seat, an end cover, a battery cell, a positive contact, a positive plate, a negative plate, a positive connecting plate and a negative connecting plate.

The lithium ion battery features on that the shell is a cylinder having an upper opening and a contact extending hole on a center of a bottom plate of the shell. A mounting hole of the negative plate is arranged at an upper end face of the locating seat. The locating seat also includes a through hole for positive plate and a through hole for negative plate while the through hole for negative plate communicates with the mounting hole. An opening of a lower end face of the through hole for positive plate and an opening of a lower end face of the through hole for negative plate are respectively arranged with a positive guide block and a negative guide block. The positive guide block and the negative guide block are supported by and cooperated with an end part of the battery cell.

A central hole is set on the cap cover and a positive plate slot around the central hole is located at an upper end face of the cap cover. A guide hole of the positive plate is penetrating the end cover and a lower end face of the end cover is tightly pressed on the negative plate and the locating seat. The end cover is detachably connected with the upper opening of the shell. A cover edge of the end cover cooperates with an end face of the upper opening of the shell.

The positive plate is circular and is disposed in the positive plate slot of the end cover. A positive conductive plate of the positive plate is passed through the guide hole of the end cover, and the through hole for positive plate to cooperate with the positive connecting plate.

The negative plate is mounted in the mounting hole of the locating seat and a negative conductive plate of the negative plate is passed through the through hole for negative plate to cooperate with the negative connecting plate.

The positive contact extends out from a contact extending hole.

The lower end face of the end cover is disposed with a circular groove while a positioning base is arranged radially outside the circular groove. The circular groove and the positive plate slot are communicated with each other by the guide hole of the positive plate. The upper end face of the locating seat is further disposed with a circular base around the mounting hole. Both the through hole for positive plate and the through hole for negative plate are mounted on the circular base. The through hole for negative plate communicates with the mounting hole. A lower end of an inner circular wall of the circular groove is leaning against the negative plate while a lower end of an outer circular wall of the circular groove cooperates with an end part of the locating seat disposed radially outside the circular base.

The lower end face of the end cover is arranged with two hooks spaced evenly in a circle thereof. A periphery of the locating seat is disposed evenly with two positioning slots while a wall of the shell is arranged with locking holes. A rod part of the hook cooperates with the positioning slot and a hook part of the hook is locked with the locking hole.

An outer surface of one end of the shell having the opening is disposed evenly with at least two projections in a circle thereof. An axial locking slot is located on the projection and the shell. A periphery of the cover edge of the end cover is disposed evenly with at least two connecting blocks. Locking blocks on a lower part of the cover edge of the end cover are integrated with the connecting block respectively. The projection and the connecting block are fastened with each other to form a positioning block. The locking block is mounted into the locking slot.

The lower end face of the end cover is arranged with two hooks spaced evenly in a circle thereof. A periphery of the locating seal is disposed evenly with two positioning slots while a wall of the cylinder is arranged with locking holes. A rod part of the hook cooperates with the positioning slot and a hook part of the hook is locked with the locking hole.

A charger of the lithium ion battery according to the present invention comprises a charging circuit board, a charging socket, and a housing. The charger further includes a positive spring and a negative spring.

The housing includes a seat and a cap cover. An interface is disposed on an upper end of the seat and a curved locking slot is on the interface. A circular support base is set on an upper part of the interface while a limit base is at a part that connects the circular support base and the interface with each other. A receiving space is mounted on a lower end face of the seat. An insertion hole is on top of the cap cover. A stopper base and a curved locking protuberance are disposed in a space of the cap cover. The charging circuit board is disposed on the circular support base while the positive spring and the negative spring are arranged in the receiving space 915 and passed through the receiving space to connect to the charging circuit board. The negative spring is located in a space of the positive spring. The positive spring and the negative spring respectively cooperate with the positive plate and the negative plate. The charging socket is arranged at the charging circuit board and is corresponding to the insertion hole of the cap cover. The curved locking protuberance of the cap cover cooperates with the curved locking slot of the seat. The limit base and the stopper base cooperate with each other for stopping. The receiving space of the seat is mounted with a guide positioning slot and the guide positioning slot cooperates with the positioning block on the shell of the battery.

The circular support base is disposed with a positioning pin while the charging circuit board is arranged with a positioning slot. The positioning slot cooperates with the positioning pin.

The charger further includes a socket positioning seat that is disposed on top of the charging socket. A positioning blind hole is mounted on the insertion hole of the cap cover. The socket positioning seat cooperates with the positioning blind hole for positioning.

The charger further includes an adaptor cable. One end of the adaptor cable cooperates with the charging socket while the other end thereof cooperates with a charging socket of appliances with charging batteries.

The lithium ion battery of the present invention has an advantage of convenient assembly due to the structure mentioned above. The lithium ion battery of the present invention overcomes shortcomings of batteries available now including ultrasonic-welded shell, complicated assembly, and low efficiency. At the same, the lithium ion battery of the present invention is applied to both flashlights and chargers. The charger of the lithium ion battery is portable so as to charge DC powdered appliances all the time. Moreover, the lithium ion battery is conveniently detachable with the charger thereof.

THE REFERENCE NUMERALS

| 1 | shell | 2 | locating seat |
|---|---|---|---|
| 3 | end cover | 4 | battery cell |

-continued

| 51 | positive contact | 52 | positive plate |
|---|---|---|---|
| 53 | negative plate | 61 | positive connecting plate |
| 62 | negative connecting plate | 11 | contact extending hole |
| 21 | mounting hole | 221 | through hole for positive plate |
| 222 | through hole for negative plate | 2211 | positive guide block |
| 2221 | negative guide block | 31 | central hole |
| 32 | positive plate slot | 33 | positive plate guide hole |
| 34 | cover edge | 521 | positive conductive plate |
| 531 | negative conductive plate | 35 | circular groove |
| 36 | positioning base | 23 | circular base |
| 37 | hook | 24 | positioning slot |
| 12 | locking hole | 371 | rod part |
| 372 | hook part | 13 | projection |
| 131 | locking slot | 341 | connecting block |
| 342 | locking block | 38 | positioning block |
| 7 | charging circuit board | 8 | charging socket |
| 9 | housing | 101 | positive spring |
| 102 | negative spring | 91 | seat |
| 92 | cap cover | 911 | interface |
| 912 | curved locking slot | 913 | circular support base |
| 914 | limit base | 915 | receiving space |
| 921 | stopper base | 922 | curved locking protuberance |
| 923 | insertion hole | 916 | guide positioning slot |
| 9131 | positioning pin | 71 | positioning slot |
| 81 | socket locating seat | 924 | positioning blind hole |
| 14 | adaptor cable | 15 | mobile phone |

DETAILED DESCRIPTION OF THE PREFERRED EMBODIMENT

The details of the present invention are shown in the following description with reference of the figures.

Figure 1:
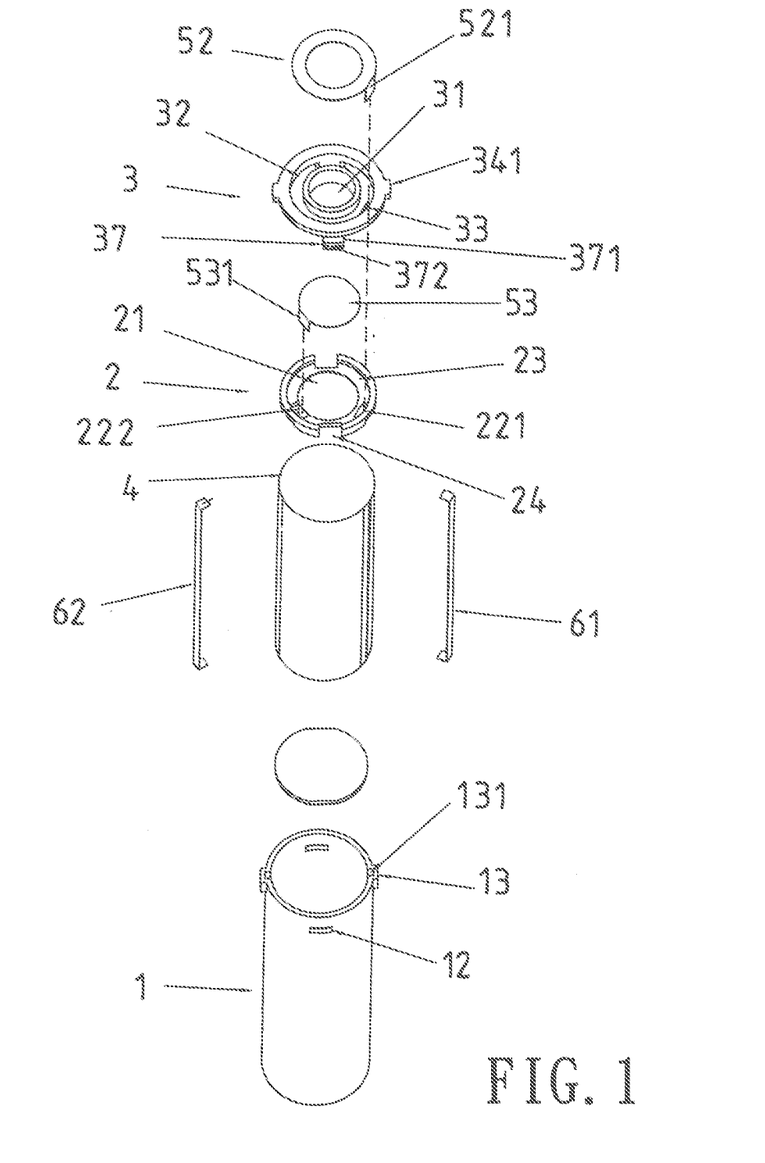
FIG. 1 is an explosive view of an embodiment of a lithium ion battery according to the present invention.
Figure 2:
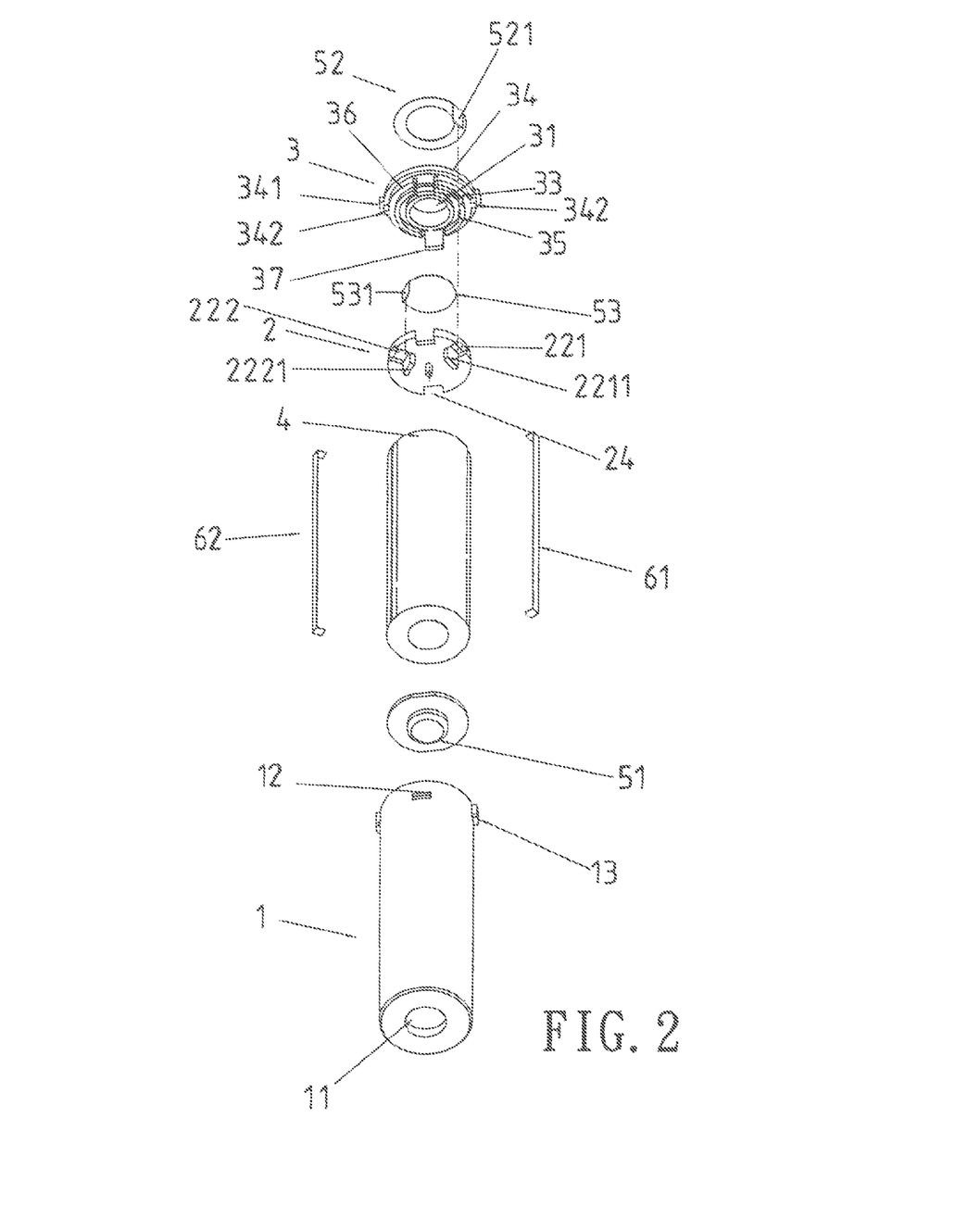
FIG. 2 is another explosive view of an embodiment of a lithium ion battery according to the present invention.
Figure 3:
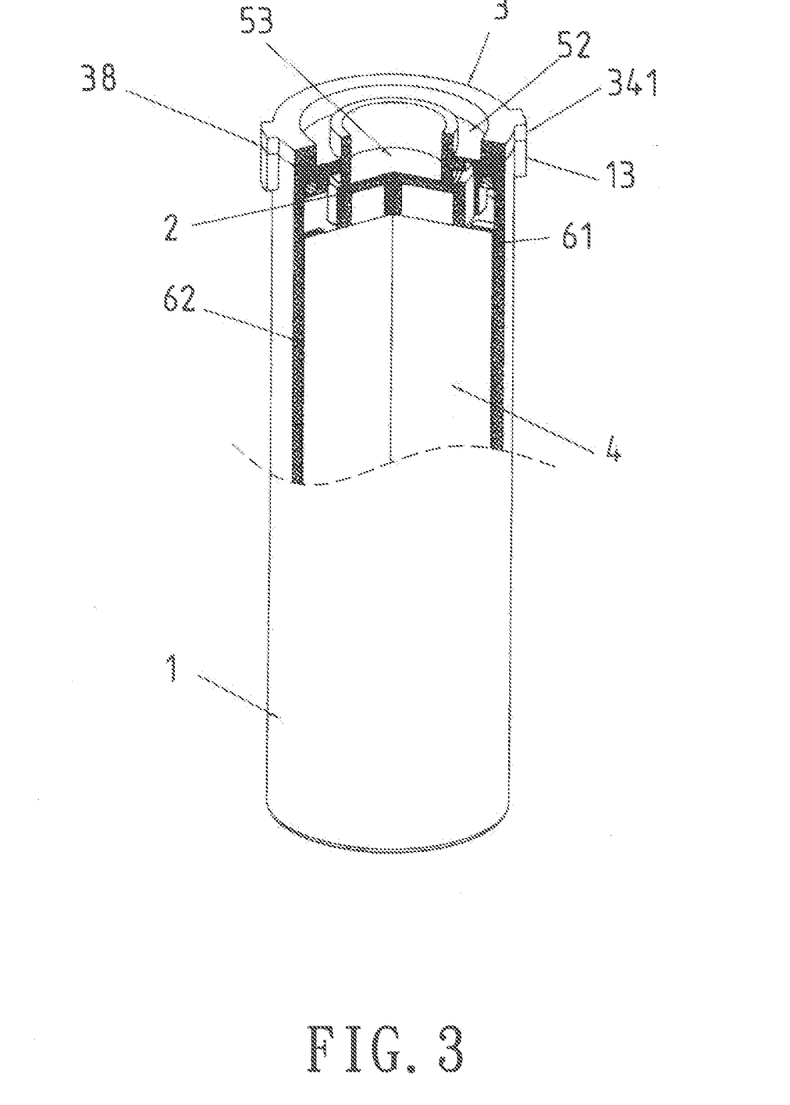
FIG. 3 is a partial cross sectional view of an embodiment of a lithium ion battery according to the present invention.
Figure 4:
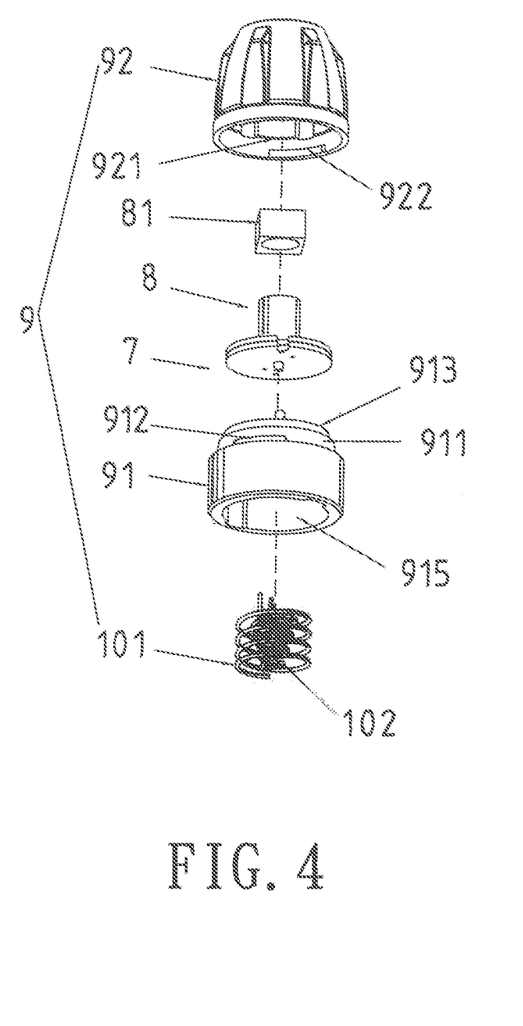
FIG. 4 is an explosive view of an embodiment of a charger according to the present invention.

As shown in FIG. 1, FIG. 2 and FIG. 3, a lithium ion battery of the present invention includes a shell 1, a locating seat 2, an end cover 3, a battery cell 4, a positive contact 51, a positive plate 52, a negative plate 53, a positive connecting plate 61 and a negative connecting plate 62.

The shell 1 is a cylinder with an upper opening. A contact extending hole 11 is disposed on a center of a bottom plate of the shell 1.

A mounting hole 21 of the negative plate 53 is arranged at an upper end face of the locating seat 2. The locating seat 2 also includes a through hole for positive plate 221 and a through hole for negative plate 222 while the through hole for negative plate 222 communicates with the mounting hole 21. An opening of a lower end face of the through hole for positive plate 221 and an opening of a lower end face of the through hole for negative plate 222 are respectively arranged with a positive guide block 2211 and a negative guide block 2221.

The end cover 3 consists of a central hole 31, a positive plate slot 32 around the central hole 31 and located at an upper end face, a positive plate guide hole 33 penetrating the end cover 3, and a cover edge 34 cooperating with an end surface of the upper opening of the shell 1. A lower end face of the end cover 3 is tightly pressed on the negative plate 53 and the locating seat 2. The end cover 3 is detachably connected with the upper opening of the shell 1.

An end part of the battery cell 4 is supporting and cooperating with the positive guide block 2211 and the negative guide block 2221 of the locating seat 2.

The positive contact 51 extends out from the contact extending hole 11.

The positive plate 52 is circular and is mounted in the positive plate slot 32 of the end cover 3. A positive conductive plate 521 of the positive plate 52 is passed through the positive plate guide hole 33 of the end cover 3, and the through hole for positive plate 221 to cooperate with the positive connecting plate 61.

The negative plate 53 is arranged in the mounting hole 21 of the locating seat 2 and having a negative conductive plate 531 thereof passed through the through hole for negative plate 222 to cooperate with the negative connecting plate 62.

The lithium ion battery of the present invention further includes a circular groove 35 on the lower end face of the end cover 3. A positioning base 36 is arranged radially outside the circular groove 35. The circular groove 35 and the positive plate slot 32 are communicated with each other by the positive plate guide hole 33. The upper end face of the locating seat 2 is further disposed with a circular base 23 around the mounting hole 21. Both the through hole for positive plate 221 and the through hole for negative plate 222 are located at the circular base 23. The through hole for negative plate 222 communicates with the mounting hole 21. A lower end of an inner circular wall of the circular groove 35 is leaning against the negative plate 53 while a lower end of an outer circular wall of the circular groove 35 is leaning against the circular base 23. The positioning base 36 cooperates with an end part of the locating seat 2 disposed radially outside the circular base 23.

The lithium ion battery of the present invention further includes two hooks 37 spaced evenly in a circle on the lower end face of the end cover 3. Two positioning slots 24 are disposed evenly on a periphery of the locating seat 2 and a wall of the shell 1 is arranged with two locking holes 12. A rod part 371 of the hook 37 cooperates with the positioning slot 24 and a book part 372 of the hook 37 is locked with the locking hole 12.

At least two projections 13 are disposed evenly in a circle on an outer surface of one end of the shell 1 with the opening. An axial locking slot 131 is mounted on the projection 13 and the shell 1. Two connecting blocks 341 are disposed evenly on a periphery of the cover edge 34 of the end cover 3. Two locking blocks 342 are arranged at a lower part of the cover edge 34 of the end cover 3 and are integrated with the connecting block 341 respectively. The projection 13 and the connecting block 341 are fastened with each other to form a positioning block 38 and the locking block 342 is mounted into the locking slot 131.

As shown from FIG. 4 to FIG. 7, a charger consists of a charging circuit board 7, a charging socket 8 and a housing 9. The charger further includes a positive spring 101 and a negative spring 102.

The housing 9 includes a seat 91 and a cap cover 92. An interface 911 is disposed on an upper end of the seat 91 and a curved locking slot 912 is on the interface 911. A circular support base 913 is set on an upper part of the interface 911 and a limit base 914 is at a part that connects the circular support base 913 and the interface 911. A receiving space 915 is mounted on a lower end face of the seat 91. A stopper base 921 and a curved locking protuberance 922 are disposed in a space of the cap cover 92 while the curved locking protuberance 922 cooperates with the curved locking slot 912 of the seat 91. The limit base 914 and the stopper base 921 cooperate with each other for stopping. An insertion hole 923 is on a top of the cap cover 92.

The charging circuit board 7 is disposed on the circular support base 913 while the positive spring 101 and the negative spring 102 are arranged in the receiving space 915 and penetrating the receiving space 915 to communicate with the charging circuit board 7. The negative spring 102 is located in a space of the positive spring 101. The positive spring 101 and the negative spring 102 respectively cooperate with the positive plate 52 and the negative plate 53.

The charging socket 8 is disposed on the charging circuit board 7 and is corresponding to the insertion hole 923 of the cap cover 92.

Figure 8:
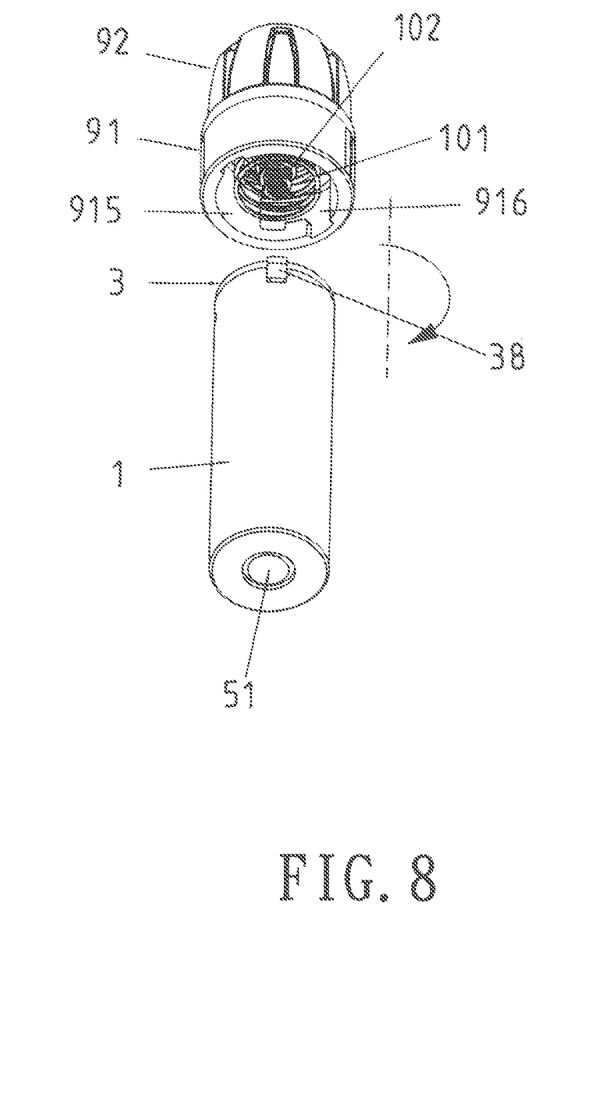
FIG. 8 is another explosive view of a lithium ion battery connected with a charger according to the present invention.
Figure 9:
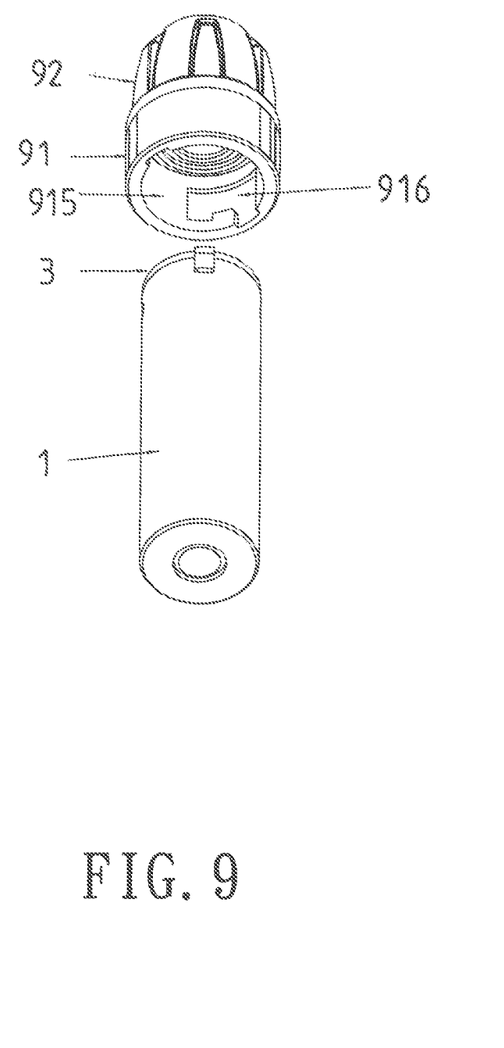
FIG. 9 is a further explosive view of a lithium ion battery connected with a charger according to the present invention.
Figure 10:
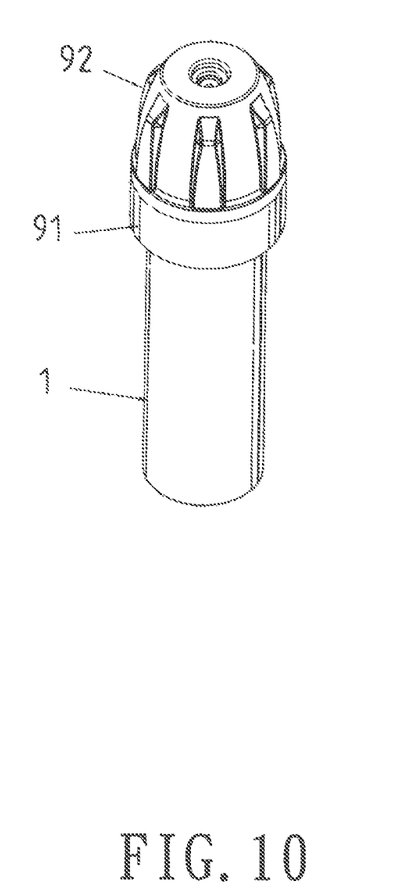
FIG. 10 is a perspective view of a lithium ion battery assembled with a charger according to the present invention.

As shown in FIG. 8 and FIG. 9, the receiving space 915 of the seat 91 is mounted with a guide positioning slot 916 and the guide positioning slot 916 cooperates with the positioning block 38 of the battery. Thus detachable connection between the lithium ion battery and the charger thereof is achieved.

Figure 5:
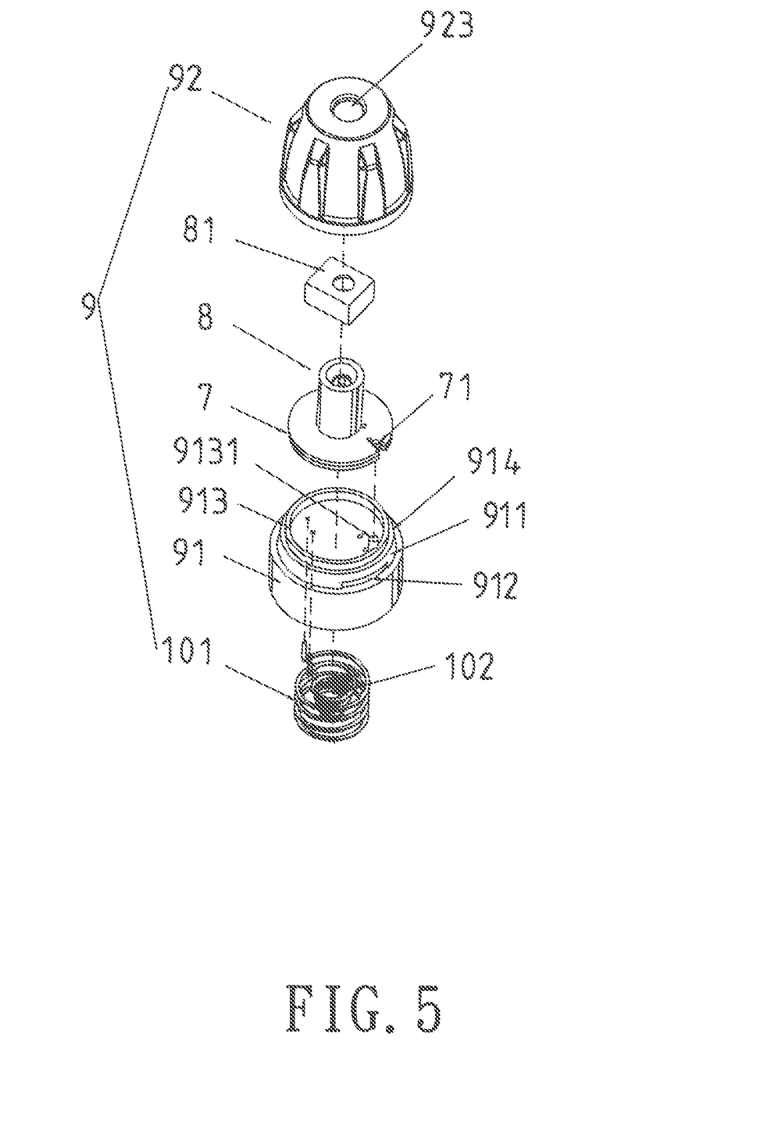
FIG. 5 is another explosive view of an embodiment of a charger according to the present invention.
Figure 6:
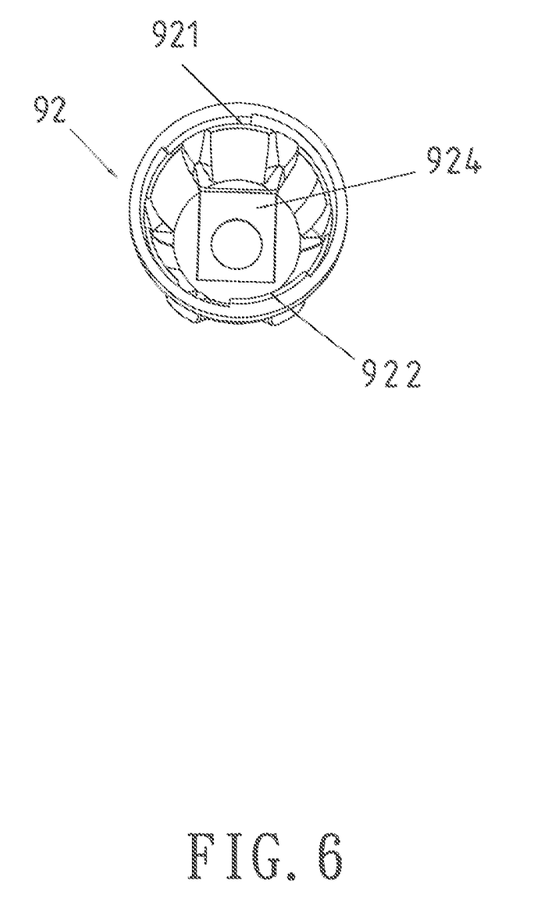
FIG. 6 is a perspective view of a cap cover of an embodiment according to the present invention.
Figure 7:
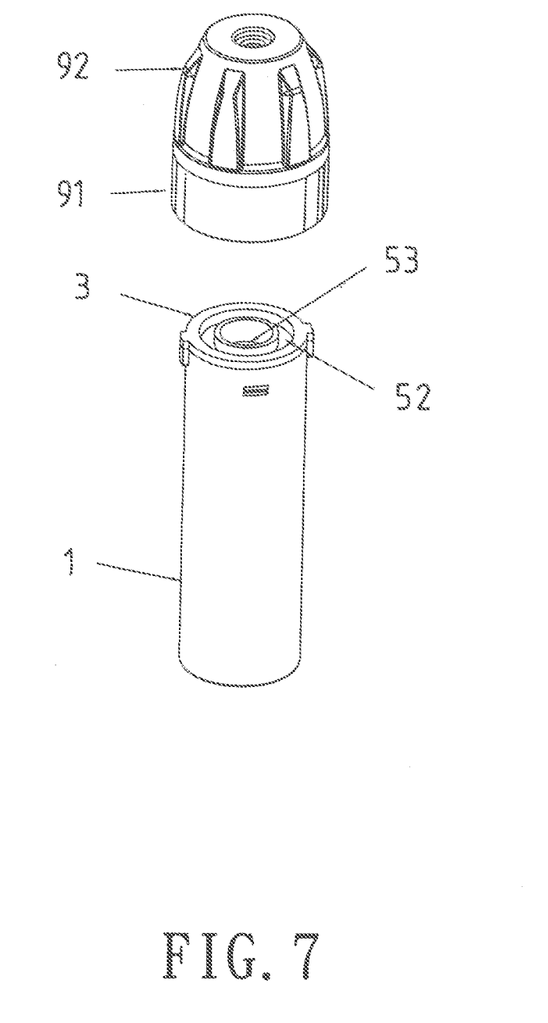
FIG. 7 is an explosive view of a lithium ion battery connected with a charger according to the present invention.

The charger of the present invention further includes a positioning pin 9131 arranged at the circular support base 913 (with reference to FIG. 5). A positioning slot 71 is disposed on the charging circuit board 7. The positioning slot 71 cooperates with the positioning pin 9131.

The charger of the present invention further includes a socket locating seat 81 (with reference to FIG. 5 and FIG. 6) disposed on top of the charging socket 8. A positioning blind hole 924 is mounted on the insertion hole 923 of the cap cover 92. The socket locating seat 81 cooperates with the positioning blind hole 924 for positioning.

Figure 11:
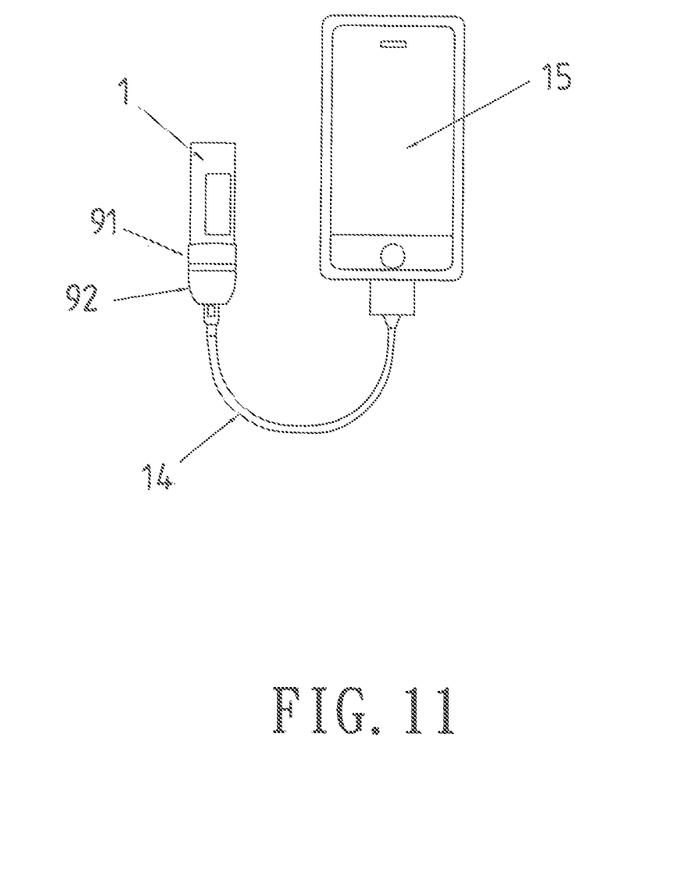
FIG. 11 is a schematic drawing showing an embodiment of a lithium ion battery and a charger is use according to the present invention.

As shown in FIG. 11, the charger of the present invention further includes an adaptor cable 14. One end of the adaptor cable 14 is passed through the insertion hole 923 of the cap cover 92 to cooperate with the charging socket 8 (with reference to FIG. 5) while the other end thereof cooperates with a charging socket of a mobile phone 15.

In practice, different adaptor cables 14 are used according to charging sockets of appliances.

While in use, as shown from FIG. 7 to FIG. 10, the lithium ion battery and the charger are assembled. The shell 1 of the lithium ion battery is mounted into the seat 91 of the charger. The positioning block 38 is first moved along the guide positioning slot 916. Then the shell 11 is rotated counterclockwise as shown in FIG. 8. The assembly of the lithium ion battery and the charger is completed. At this moment, the positive and negative springs 101, 102 are respectively connected to and cooperated with the positive plate 52 and the negative plate 53.

The invention claimed is:
1. A charger for a lithium ion battery comprising:
a charging circuit board, a charging socket and a housing; wherein:
the charger further includes a positive spring and a negative spring; the housing includes a seat and a cap cover;
an interface is disposed on an upper end of the seat and a curved locking slot is on the interface; a circular support base is set on an upper part of the interface and a limit base is at a part that connects the circular support base and the interface; a receiving space is formed on a lower end face of the seat, and the seat is connected to the battery;
an insertion hole is on top of the cap cover, and a stopper base and a curved locking protuberance are disposed in a space of the cap cover; the curved locking protuberance of the cap cover cooperates with the curved locking slot of the seat; the limit base and the stopper base cooperate with each other for stopping;
the charging circuit board is disposed on the circular support base;
the positive spring and the negative spring are arranged in the receiving space and passed through the receiving space to connect to the charging circuit board; the negative spring is located in a space of the positive spring; the positive spring and the negative spring respectively cooperate with a positive plate and a negative plate;

the charging socket is arranged at the charging circuit board and is corresponding to the insertion hole of the cap cover;

the receiving space of the seat communicates with a guide positioning slot, and the guide positioning slot cooperates with a positioning block defined on the shell of the battery.

2. The device as claimed in claim 1, wherein the receiving space of the seat receives one end of the shell having at least two projections formed on an outer surface thereof; an axial locking slot is located on the projection and the shell; a periphery of a cover edge of an end cover is disposed evenly with at least two connecting blocks; a lower part of the cover edge of the end cover is arranged with locking blocks integrated with the connecting blocks; the locking block is mounted into the axial locking slot and the projection and the connecting block are fastened with each other to form the positioning block, and the positioning block cooperates with the guide positioning slot.

3. The device as claimed in claim 1, wherein a positioning pin is arranged at the circular support base and a positioning slot is disposed on the charging circuit board; the positioning slot cooperates with the positioning pin.

4. The device as claimed in claim 1, wherein the charger further includes a socket positioning seat that is disposed on top of the charging socket; a positioning blind hole is formed to communicate with the insertion hole of the cap cover and the socket positioning seat cooperates with the positioning blind hole for positioning.

5. The device as claimed in claim 1, wherein the charger further includes an adaptor cable; one end of the adaptor cable cooperates with the charging socket while the other end thereof cooperates with a charging socket of appliances with charging batteries.

* * * * *